(12) United States Patent
Zhu et al.

(10) Patent No.: US 9,884,507 B2
(45) Date of Patent: Feb. 6, 2018

(54) SEARCHABLE BINDER WITH INDUCTIVE ADDRESS CODE TRANSFER

(71) Applicants: Shengbo Zhu, San Jose, CA (US); Su Shiong Huang, Bellevue, WA (US)

(72) Inventors: Shengbo Zhu, San Jose, CA (US); Su Shiong Huang, Bellevue, WA (US)

(73) Assignee: MICRODATA CORPORATION, San Jose, CA (US)

( * ) Notice: Subject to any disclaimer, the term of this patent is extended or adjusted under 35 U.S.C. 154(b) by 46 days.

(21) Appl. No.: 14/998,563

(22) Filed: Jan. 19, 2016

(65) Prior Publication Data

US 2017/0203604 A1    Jul. 20, 2017

(51) Int. Cl.
*B42F 13/40* (2006.01)
*G08B 5/36* (2006.01)
*G06K 7/10* (2006.01)

(52) U.S. Cl.
CPC .......... *B42F 13/40* (2013.01); *G06K 7/10366* (2013.01); *G08B 5/36* (2013.01)

(58) Field of Classification Search
None
See application file for complete search history.

(56) References Cited

U.S. PATENT DOCUMENTS

| | | | |
|---|---|---|---|
| 6,335,686 B1 * | 1/2002 | Goff | G06K 7/10079 340/572.4 |
| 8,717,143 B2 * | 5/2014 | Zhu | B42F 13/40 211/119.003 |
| 2010/0194538 A1 * | 8/2010 | dos Reis Medeiros | G06K 7/0008 340/10.1 |

* cited by examiner

*Primary Examiner* — Daniell L Negron

(57) ABSTRACT

A binder management system having a cabinet with shelves for removable storage of searchable binders. Each binder has a body with front and rear covers and a spine. Inside the body is a binder mechanism for removably retaining sheet media. Each binder has a planar receiving antenna mounted on the spine in a plane parallel to the lower margin of the spine or mounted on one of the covers in a plane parallel to the cover plane Each binder has a binder identification circuit coupled to the receiving antenna and to an LED mounted on the binder spine in a location visible when the binder rests on a shelf. When a binder identification signal from a host computer is detected by the receiving antenna it is transferred to the binder identification circuit. If the signal matches an address code stored in the binder identification circuit, the LED is activated to aid the user in finding the binder. Transmitting antennae are mounted on the shelves to broadcast the binder identification signals to the receiving antenna mounted in the binder. An LED and an optional audible indicator are mounted on the shelves to further aid the user in finding the sought binder.

16 Claims, 12 Drawing Sheets

Vertical Antenna Mode

SEARCHABLE BINDER WITH INDUCTIVE ADDRESS CODE TRANSFER

BACKGROUND OF THE INVENTION

This invention relates to documents management in general, and in particular to an improved documents management technique using a set of searchable binders.

In medical records, legal and business offices, and some homes, notebook binders (hereinafter "binders") are typically used to store documents used for medical, legal, other business and personal purposes. A typical binder has a front cover, a rear cover and a spine joining the two covers. Inside the binder, a multi-ring manually operable binder mechanism having two or more two-piece arcuate rings is permanently mounted to facilitate insertion, storage and removal of documents having a number of holes formed along a mounting edge, with the number of holes corresponding to the number of rings of the binder mechanism. Each binder is typically removably supported on a shelf by placing the bottom edges of the binder covers and spine of a closed binder on the top surface of the supporting shelf. Several binders are typically installed on a given shelf, and several shelves are typically incorporated into a shelf support structure, such as a cabinet. In order to enable the documents contained in the various binders to be readily accessed, some type of documents management system is necessary.

Documents management is typically performed by binder management. Each document is initially assigned to, and placed in, an identified binder dedicated to documents of a particular subject matter (e.g., "utility bills for a specific account"). Later-generated related documents are typically assigned to and placed in this same binder. When a binder is filled to capacity by documents, a new binder is provided for receiving additional documents of the same category.

Binder management is typically conducted by providing each binder with a label in a location (usually somewhere on the spine of the binder) in which the label is visible when the binder is stored on a shelf. The label contains readable information describing the content of the binder. The readable information is typically a short form of identification, such as an account name, a subject name (e.g., "Bank Statements") or the like.

In order to provide ready access to the individual documents contained in the binders, some type of indexing arrangement is normally used to identify the location of each binder. A simple technique commonly employed is a manually prepared master list of all binders in the binder management system referencing each binder by the label information and noting the shelf and cabinet location of each binder. In large installations, more sophisticated indexing arrangements are used, such as a computer-based index listing all binders by a short form identifier and a corresponding enlarged and more thorough description of the binder contents. Even such computer-based arrangements still require the use of a readable label on each binder in order to identify a given binder to a user. This is highly undesirable, since it facilitates the search by any unauthorized user for a specific binder name or for a binder containing information of a particular type. Nevertheless, known binder management systems require the use of visible labels in order for the binders to be reasonably locatable.

In those applications in which several individuals have access to the binders, some arrangement is usually made to monitor the disposition of the binders. For example, in a business application, it is convenient and sometimes necessary to provide a sign out and return procedure so that the whereabouts of a given binder will always be known. Usually, such monitoring attempts fail to accurately track the binders because of the failure of individuals to faithfully follow the procedure. Consequently, at any given time, the integrity of the binder management system can only be verified by actually looking through each shelf and comparing the binders and their contents with the master index. This requirement is both time-consuming and burdensome, and thus a severe disadvantage.

In known binder management systems of the type described above, once a binder is provided with a contents identifier, that binder is permanently associated with the nature of its contents. To change the contents to some other category, the binder must either be thrown away and a new, unmarked binder substituted in its place, or the identification label must be changed. In addition, the master index must be up-dated, either manually or by using the computer in a computer-based indexing system. These procedures are not always followed by office personnel, and the integrity of the binder system is consequently compromised.

In all examples of known binder management systems, the binders are usually provided with some type of human readable or machine readable identification indicia, such as the label affixed to the spine of each binder. In more sophisticated systems, a computer is used to assist in keeping track of the binders. When a binder is removed from the usual location, some procedure is typically available to note the fact that that binder has been removed from its normal location. This procedure normally relies on either manual entry of the change into the system computer by an operator, or the use of label reading devices (e.g., bar code readers) to enter the information into the system computer. Unfortunately, not all users follow the binder tracking procedure faithfully and the result is that many binders can be missing from their assigned shelf positions at any given time.

A further disadvantage with known binder management systems lies in the fact that it is unnecessarily time-consuming to visually locate a sought binder even if that binder is in its proper location. The user must visually scan the spine label of each binder on a given shelf in a given cabinet until the sought binder is visually identified by the label information. If the sought binder has been previously misplaced on the wrong shelf of the same cabinet, the user must then visually scan all binders on the other shelves of that same cabinet until the sought binder is visually identified. If, after visually scanning all binders on all shelves of the same cabinet, the sought binder has not been found the user has no other recourse than to continue the visual scanning process on binders on shelves in the other cabinets in the binder storage area until the sought binder is located or all binders on all shelves of all cabinets in the binder storage area have been visually scanned and the sought binder has still not been located.

U.S. Pat. No. 8,717,143 issued May 6, 2014 (hereinafter the '143 patent) discloses a searchable binder suitable for use in a binder management system which is devoid of the above-noted disadvantages and which enables quick and efficient location of binders in a document management system. More particularly, the binder management system has a cabinet with shelves for removable storage of searchable binders. Each binder has a body with front and rear covers and a spine. Inside the body is a binder mechanism for removably retaining sheet media. Each binder has externally extending upper and lower ohmic contact members which ohmically engage conductive members mounted on the shelf surfaces near the front. Each binder has a binder identification circuit coupled to an LED mounted on the binder spine in a location visible when the binder rests on a shelf. When a binder identification signal from a host computer is presented to the shelf conductive members it is transferred by the binder contact members to the binder identification circuit. If the binder identification signal matches a code stored in the binder identification circuit, the LED is activated to aid the user in finding the binder. An LED and an optional audible indicator are mounted on the shelves to further aid the user in finding the sought binder.

FIGS. 1 and 2 illustrate a representative embodiment of a single binder according to the '143 invention. As seen in these Figs., a binder 10 has a front cover 12, a back cover 14 and a spine 15 joining the front and back covers 12, 14. A conventional multi-ring manually operable binder mechanism 16 having a plurality (3 illustrated) of two-piece arcuate rings 18 is permanently mounted to the inner face of rear cover 14 to facilitate insertion, storage and removal of documents having a number of holes formed along a mounting edge, with the number of holes corresponding to the number of rings 18 of the binder mechanism 16. Mounted on the inner surface of spine 15 are a binder identification circuit 20 carried by a substrate 20a, a pair of ohmic conductors 21, 22, an upper ohmic contact 24, a lower ohmic contact 25, and a visible indicator 27, preferably an LED. Visible indicator 27 is mounted in an opening formed in spine 15 so as to be visible from the outer side of binder 10. Upper and lower ohmic contacts 24, 25 are arranged on spine 15 in a position extending slightly above and below the upper and lower margins of spine 15 as shown. Each ohmic contact 24, 25 is a spring contact having a curved engagement portion 28 to promote sliding engagement with conductive strips which are carried by the binder support shelves in the binder storage cabinet. This arrangement enables the upper and lower ohmic contacts 23, 25 to ohmically engage conductive strips mounted on the shelves on which the binder can be removably stored. Thus, when a binder identification signal from a host computer is presented to the shelf conductive members it is transferred by the binder contacts 24, 25 to the binder identification circuit 20. If the signal matches, the LED 27 is activated to aid the user in finding the binder.

The other binder embodiment shown in the '143 patent has an ohmic contact arrangement similar in principle to the embodiment shown in FIGS. 1 and 2, but having ball and spring contact elements which effect the ohmic transfer of the incoming binder identification signal to the binder identification circuit 20. Both embodiments require both mechanical and ohmic contact between the shelf-mounted conductive strips and the contact elements. Over time, the conductive strips, the contact elements, or both can become mechanically worn or corroded, thus impairing the operability of the binder management system.

SUMMARY OF THE INVENTION

The invention comprises a searchable binder and binder management system which enjoys all the advantages of the '143 binder and system but does not require mechanical and ohmic contact between any binder elements and conductive strips mounted on a cabinet shelf, and thus eliminates any potential loss of operability due to aging of contact elements since none are required.

From an apparatus standpoint, the invention comprises a searchable binder for use in a binder management system, the binder comprising a binder body having a front cover, a rear cover and a spine joining the front cover and the rear cover; a binder mechanism mounted in the interior of the binder body; a visible indicator mounted on the binder body in a position visible from the outside of the binder; a receiving antenna carried by the binder body for receiving a binder identification signal from a source; and a binder identification circuit mounted on the binder body and coupled to the receiving antenna and the visible indicator for activating the visible indicator when a received binder identification signal designates the binder as a sought binder.

The binder identification signal comprises a binder address unique to the associated binder; and the binder identification circuit includes an addressable decoder.

The binder mechanism is preferably mounted to an inner surface of the rear cover. The visible indicator is preferably mounted on the spine.

In a first embodiment, the spine has a lower margin and the receiving antenna has an essentially planar configuration and is mounted on the spine substantially parallel to the lower margin of the spine so that the receiving antenna is located in an essentially horizontal position when the binder is resting on an associated cabinet shelf.

In a second embodiment, one of the front cover and the rear cover, preferably the front cover, is substantially planar, and the receiving antenna has an essentially planar configuration and is mounted on the cover with the essentially planar configuration in a plane substantially parallel to the plane of the cover on which it is mounted so that the receiving antenna is located in an essentially vertical position when the binder is resting on an associated cabinet shelf.

From a combination standpoint, the invention comprises a storage cabinet for a plurality of searchable binders, the cabinet having at least one shelf; a transmitting antenna element carried by the at least one shelf for transmitting binder signals from a source; and a searchable binder adapted to be removably received on the shelf, the binder comprising a binder body having a front cover, a rear cover, and a spine joining the front cover and the rear cover; a binder mechanism mounted in the interior of the binder body; a visible indicator mounted on the binder body in a position visible from the outside of the binder when the binder is installed on the shelf; a receiving antenna carried by the binder body for receiving a binder identification signal from the transmitting antenna element; and a binder identification circuit mounted on the binder body and coupled to the receiving antenna and the visible indicator for activating the visible indicator when a received binder identification signal designates the binder as the sought binder.

The binder identification signal comprises a binder address unique to the associated binder; and the binder identification circuit includes an addressable decoder.

The binder mechanism is preferably mounted to an inner surface of the rear cover. The visible indicator is mounted on the spine.

In a first embodiment, the spine has a lower margin, and the receiving antenna has an essentially planar configuration and is mounted on the spine so that the receiving antenna is located in an essentially horizontal position when the binder is resting on the shelf.

In a second embodiment, one of the front cover and the rear cover, preferably the front cover, is substantially planar, and the receiving antenna has an essentially planar configuration and is mounted on the cover with the essentially planar configuration in a plane substantially parallel to the plane of the cover on which it is mounted so that the receiving antenna is located in an essentially vertical position when the bonder is resting on an associated cabinet shelf.

The transmitting element preferably comprises a plurality of multi-turn essentially planar coils arranged in a mutually spaced array of at least two rows with coils in one row laterally spaced with respect to coils in another row.

The cabinet preferably has a visible indicator mounted on a shelf for visually indicating the presence of a sought binder on the shelf. The cabinet may also have an audible indicator mounted on a shelf for audibly indicating the presence of a sought binder on a shelf.

From another standpoint, the invention comprises a transmitting antenna element for use with an essentially planar receiving antenna arranged at an angle with respect to the transmitting antenna element, the transmitting element comprising a 'support surface', and a plurality of multi-turn essentially planar coils carried by the support surface and arranged in a mutually spaced array of at least two rows with coils in one row laterally offset with respect to coils in another row. The coils in a given row are preferably mutually spaced by an amount substantially equal to one-half the length dimension of the individual coils, and the coils in one row are laterally offset with respect to coils in another row by an amount substantially equal to one-quarter the length dimension of the individual coils.

As with the '143 patent binder management system, to find a searchable binder an operator may enter the appropriate binder information into a host computer, which can perform a table look-up for the binder identification information—i.e. system address, and transmit this information to all binder cabinets. When a binder identification signal is matched to a binder by the binder identification circuit, the visible indicator on the corresponding binder is activated and the user can visually identify the binder being sought. In addition, for large or brightly lit binder storage areas the shelf visible indicators and the optional shelf audible indicators assist the user in locating the sought binder.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
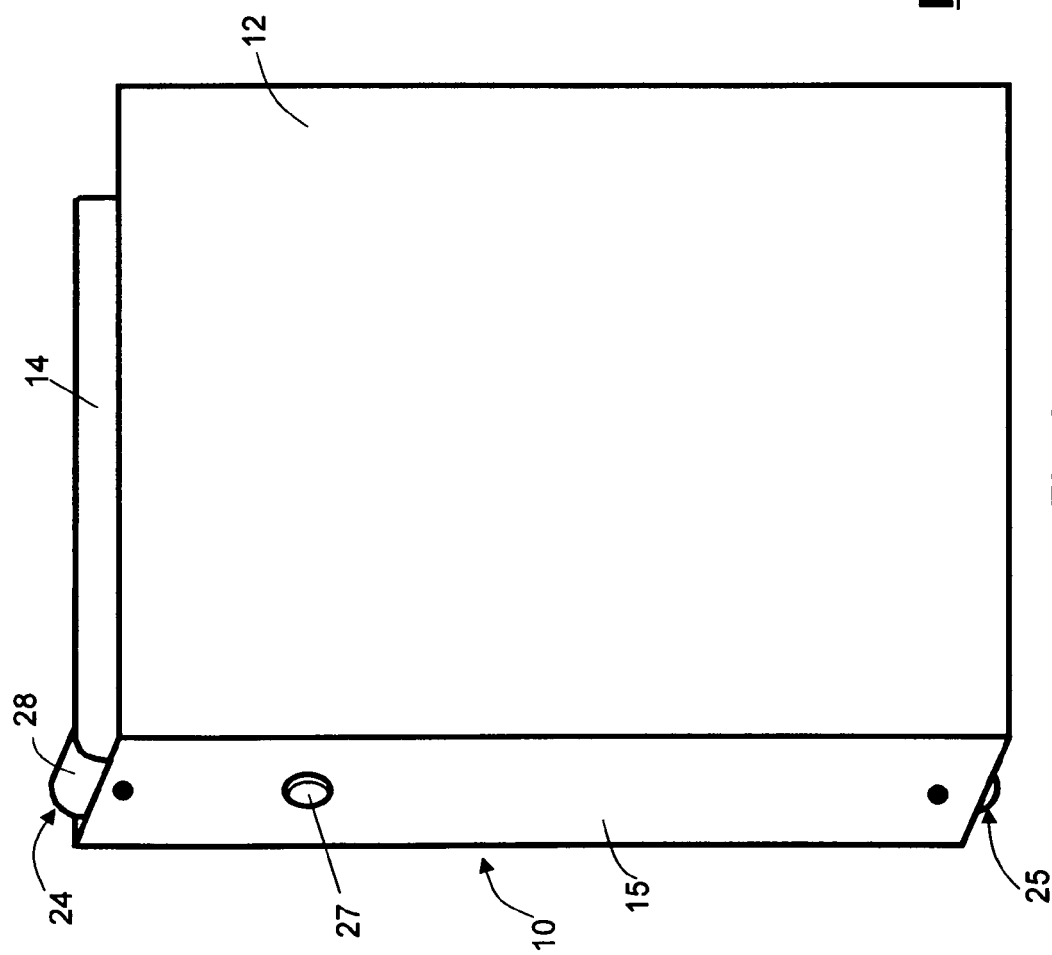
FIG. 1 is a perspective view of a binder according to the prior art.
Figure 2:
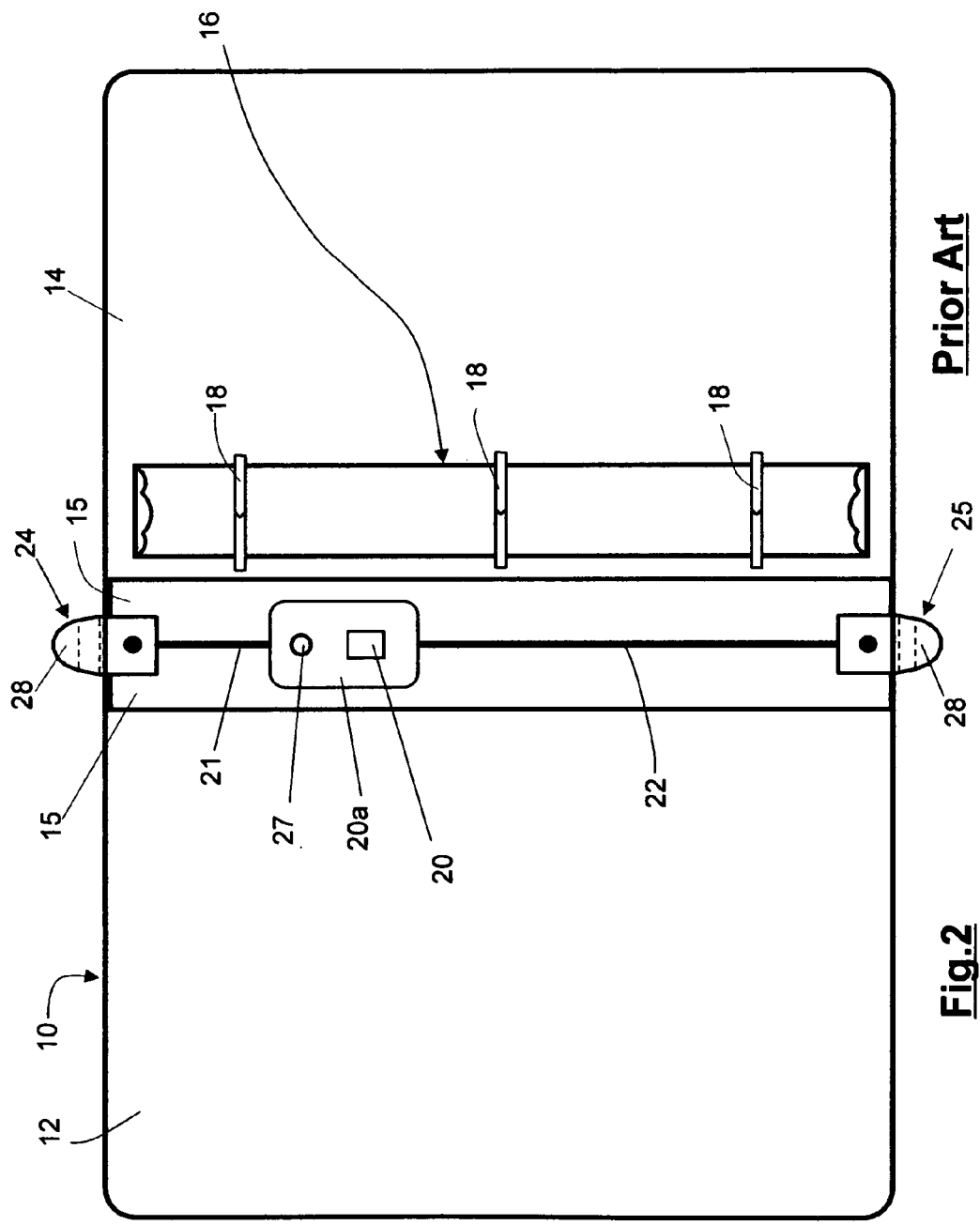
FIG. 2 is a plan view of the binder of FIG. 1 in the opened position.
Figure 3:
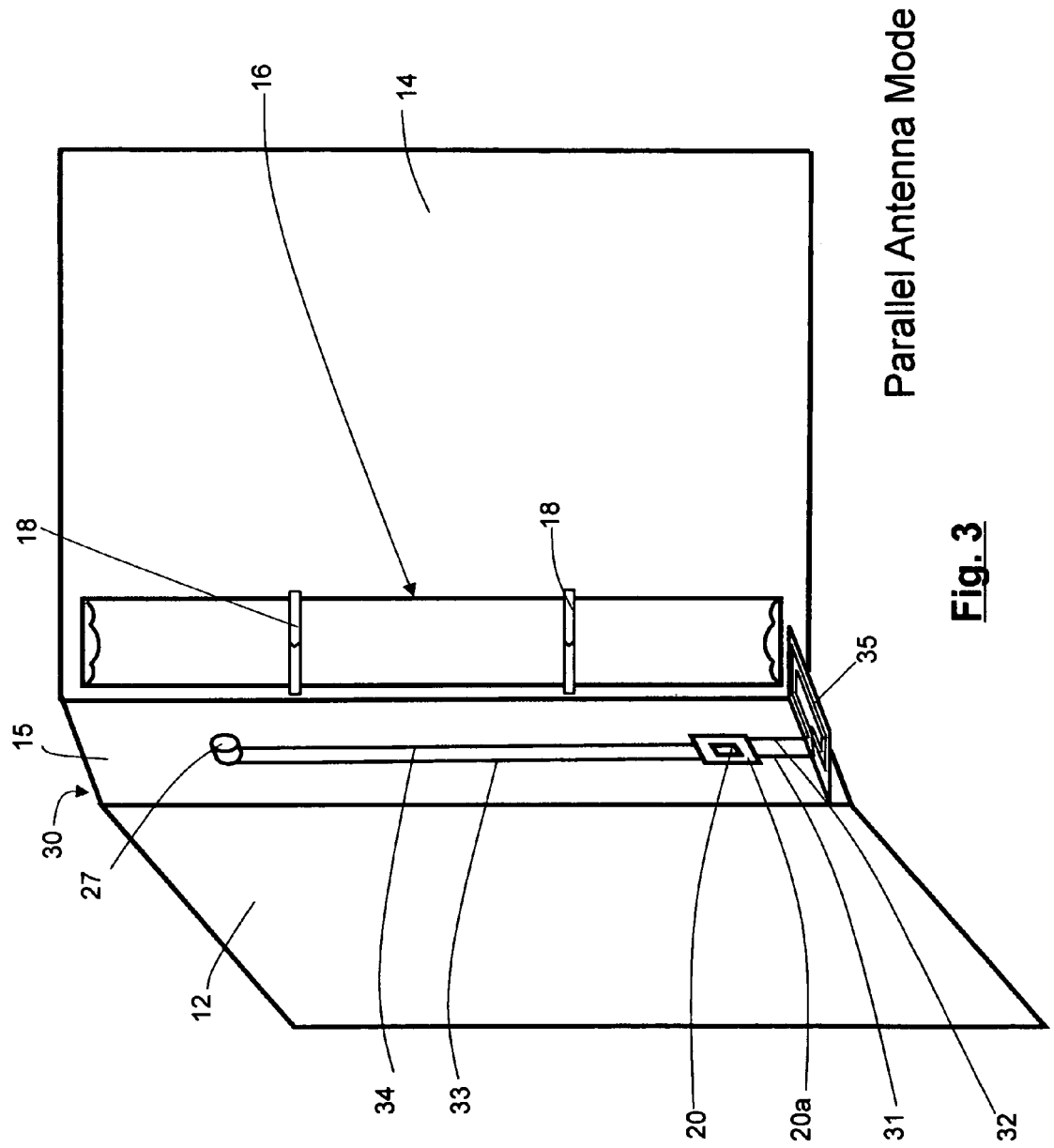
FIG. 3 is a perspective view of a first embodiment of a binder according to the invention.

Turning to the drawings illustrating the invention, FIG. 3 is a perspective view of a first embodiment of a binder according to the invention. As seen in this Fig., a binder generally designated with reference numeral 30 has a front cover 12, a back cover 14 and a spine 15 joining the front and back covers 12, 14. A conventional multi-ring manually operable binder mechanism 16 having a plurality (2 illustrated) of two-piece arcuate rings 18 is permanently mounted to the inner face of rear cover 14 to facilitate insertion, storage and removal of documents having a number of holes formed along a mounting edge, with the number of holes corresponding to the number of rings 18 of the binder mechanism 16. Mounted on the inner surface of spine 15 are a binder identification circuit 20 carried by a substrate 20a, a pair of lower ohmic conductors 31, 32, and a visible indicator 27 ohmically connected to binder identification circuit 20 via a pair of upper ohmic conductors 33, 34. Visible indicator 27 is preferably an LED mounted in an opening formed in spine 15 so as to be visible from the outer side of binder 30.

Secured to the lower edge of spine 15 is a single essentially planar multi-turn receiving antenna 35, which is ohmically connected to binder identification circuit 20 via lower ohmic conductors 31, 32. Receiving antenna 35 is arranged such that the plane thereof is essentially parallel to the lower edge of spine 15 so that antenna 35 is positioned in a horizontal manner when binder 30 is removably installed on a shelf in a binder storage cabinet. When so positioned, antenna 35 is capable of optimally receiving binder identification signals emanating from a single transmitting antenna 40 shown in FIG. 4.

Figure 4:
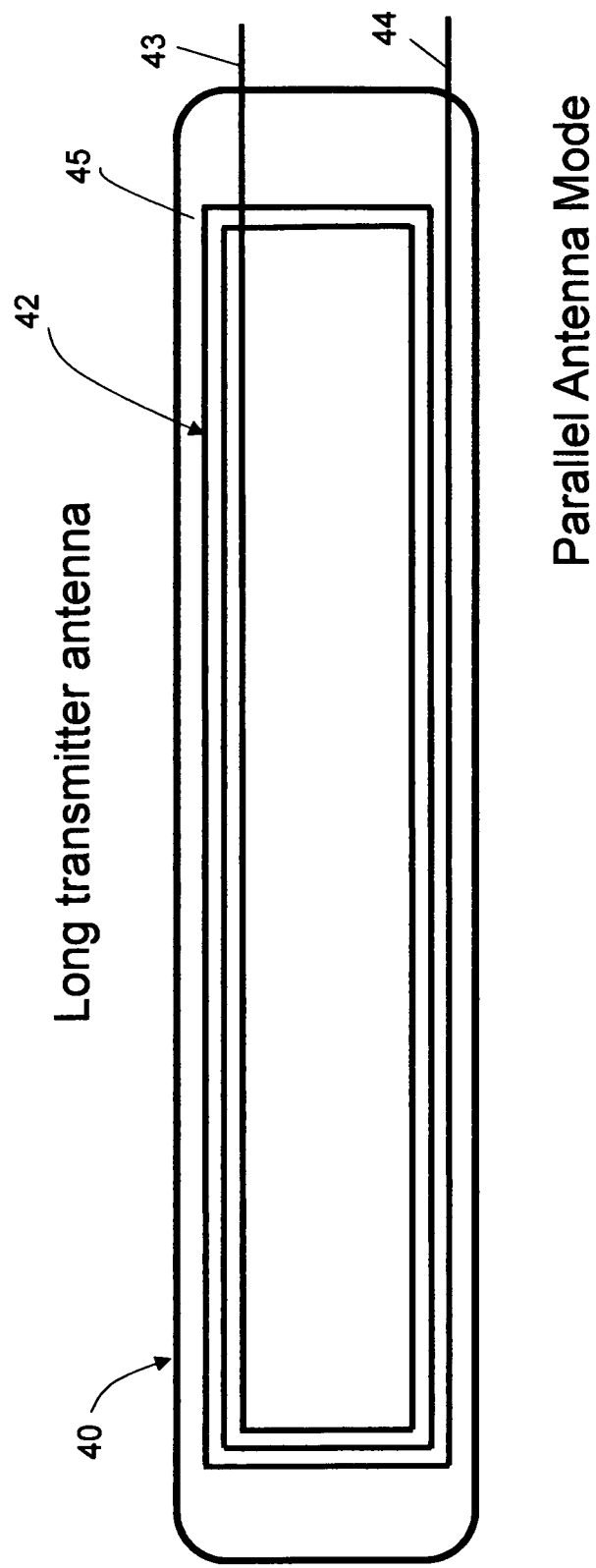
FIG. 4 is a plan view of a first antenna used to transfer binder identification signals to the binder of FIG. 3.
Figure 10:
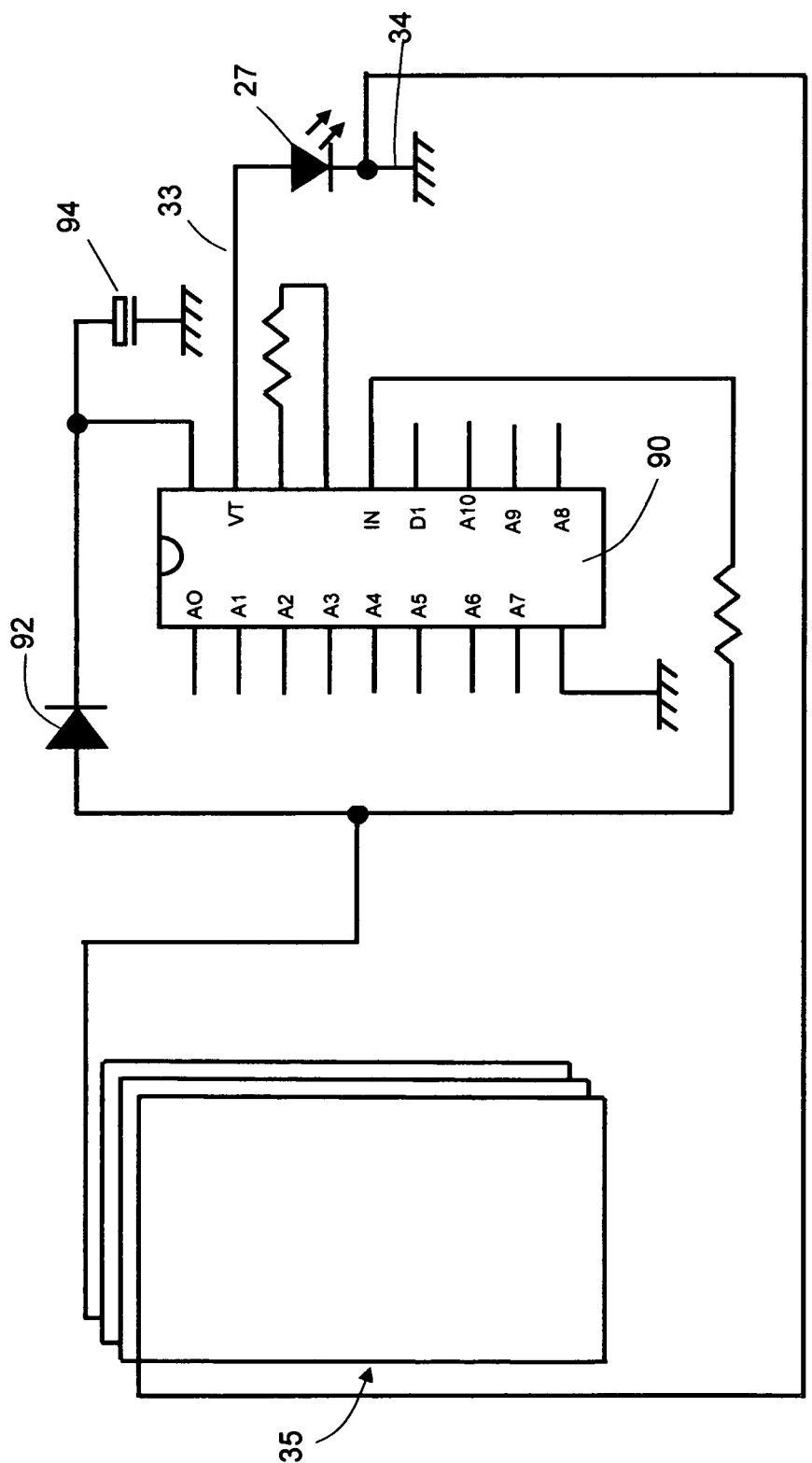
FIG. 10 is a schematic view of a binder identification circuit using an addressable decoder.

With reference to FIG. 4, which is a plan view taken from above, transmitting antenna 40 is an essentially planar multi-turn coil 42 having a pair of terminals 43, 44 to which modulated binder identification signals are coupled from a modulation unit, one of which is illustrated in FIG. 10 described below. Coil 42 is secured to a substrate 45, which provides a support structure for mounting transmitting antenna 40 to an upper surface of a shelf in a binder storage cabinet shown in FIG. 7 and described below. Substrate 45 may be fabricated from any suitable material, such as sheet fiberglass material used in the fabrication of printed circuits. Coil 42 can be formed using standard plating and etching techniques which are well known in the art of printed circuit board manufacture. After forming coil 42, transmitting antenna 40 can be installed on the upper surface of a shelf in a binder storage cabinet by applying a suitable adhesive to the coil side of substrate 45 and adhering the coil side to the upper surface of the shelf. By mounting the transmitting antenna 40 with the coil side down, the back surface of substrate 45 is the surface which makes sliding contact with a binder 30 when the binder 30 is installed and removed from the shelf of the binder storage cabinet, which eliminates wear and tear on the coil 42. The length and width dimensions of transmitting antenna 40 are selected to match the dimensions of the shelves in the binder storage cabinet so that the length of transmitting antenna 40 spans the width of a given shelf and the width of transmitting antenna 40 spans the area where a binder antenna 35 is located when transmitting antenna 40 is installed properly and a binder 30 is positioned on a given shelf.

While the configuration of the first embodiment of binder 30 shown in FIGS. 3 and 4 works well with most binders, some binders do not have sufficient width of spine 15 to accommodate a receiving antenna 35 installed in a horizontal attitude and of sufficient coil area to reliably receive binder identification signals from a horizontally mounted single transmitting antenna 40. In general, the FIGS. 3 and 4 embodiment works very well with binders having a spine width of at least one inch.

Figure 5:
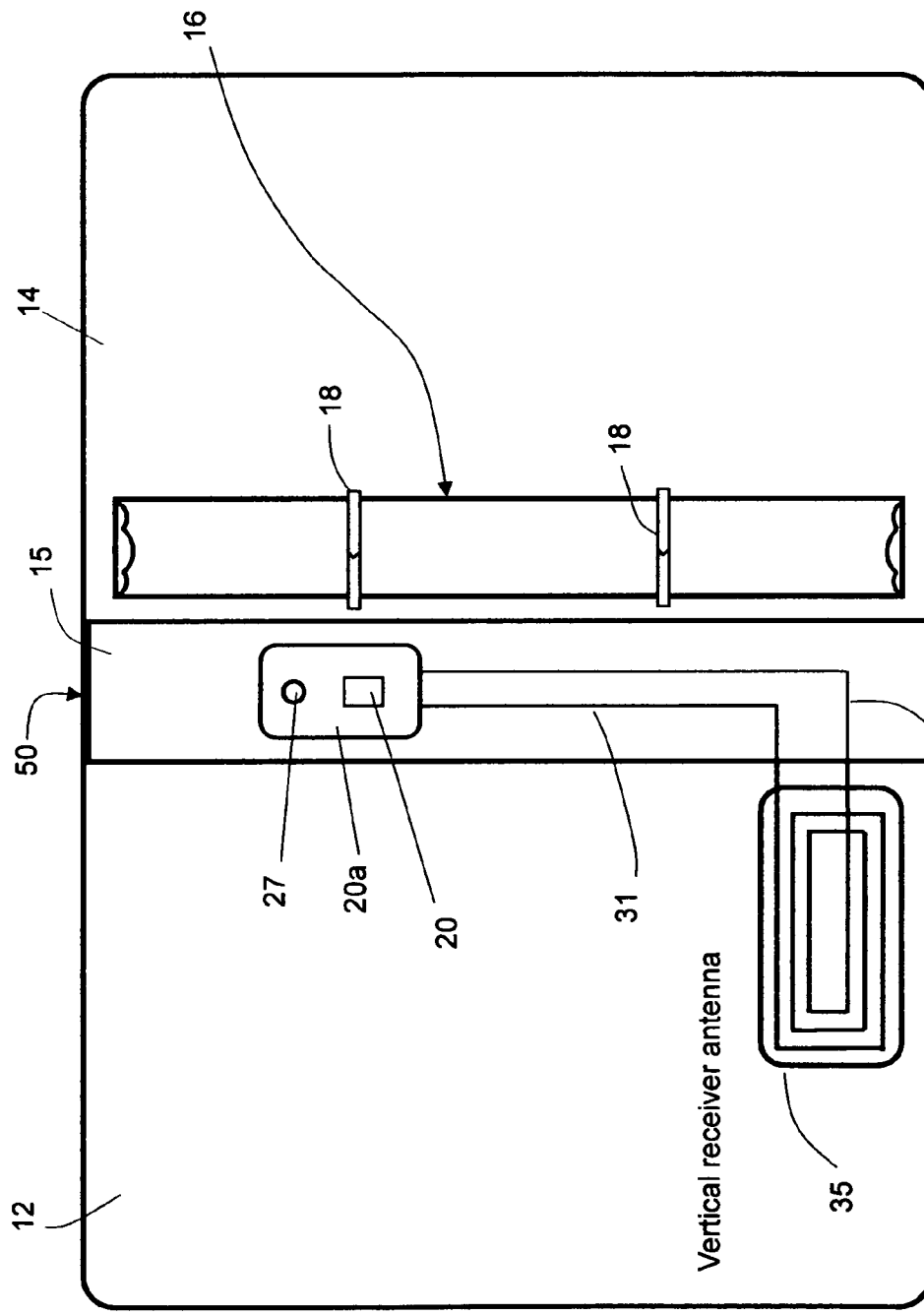
FIG. 5 is a plan view of a second embodiment of a binder according to the invention.
Figure 6:
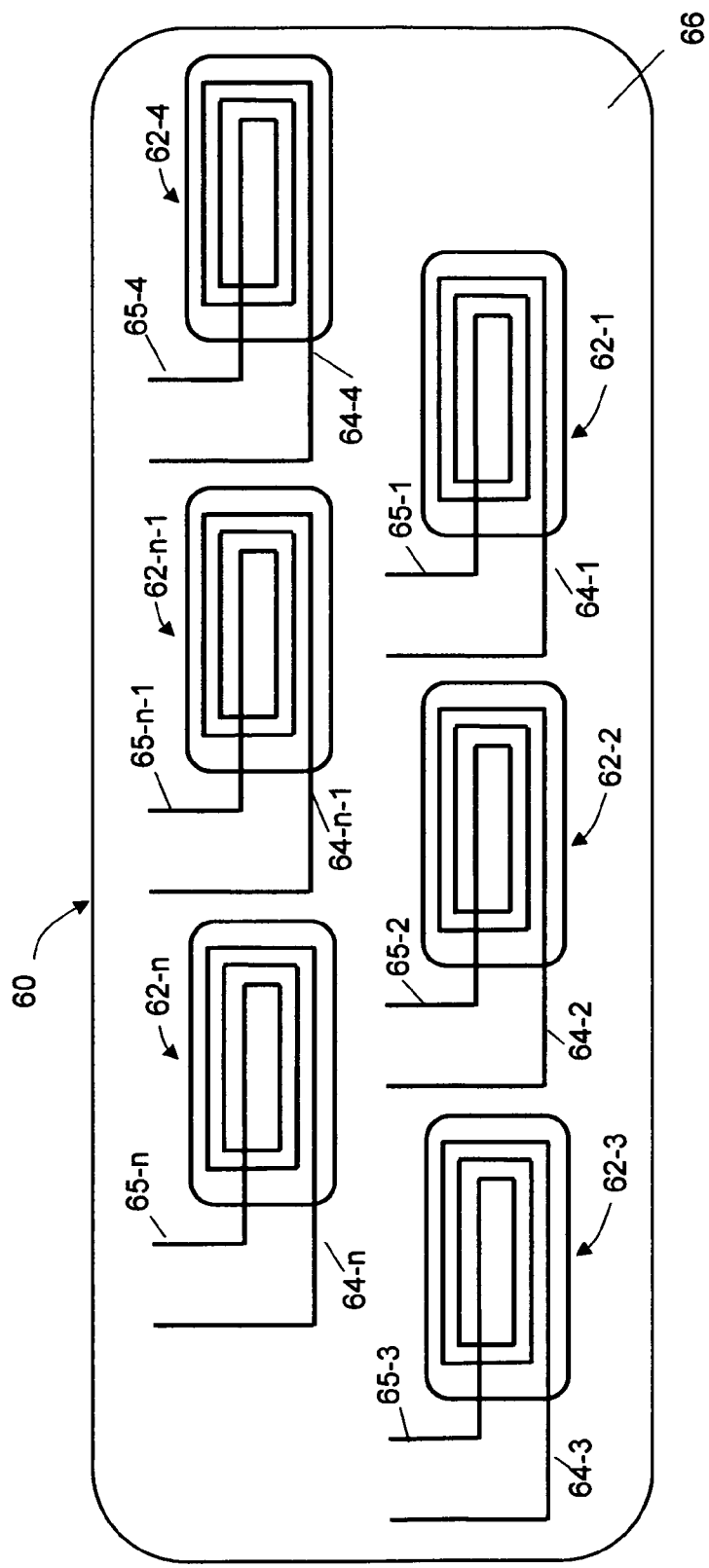
FIG. 6 is a plan view of an antenna array used to transfer binder identification signals to the binder of FIG. 3 and the binder of FIG. 5.

For binders having a spine width of less than one inch, the embodiment shown in FIGS. 5 and 6 has been found to perform reliably and is preferred. As seen in these Figs., a binder 50 has a front cover 12, a back cover 14 and a spine 15 joining the front and back covers 12, 14. A conventional multi-ring manually operable binder mechanism 16 having a plurality (2 illustrated) of two-piece arcuate rings 18 is permanently mounted to the inner face of rear cover 14 to facilitate insertion, storage and removal of documents having a number of holes formed along a mounting edge, with the number of holes corresponding to the number of rings 18 of the binder mechanism 16. Mounted on the inner surface of spine 15 are a binder identification circuit 20 carried by a substrate 20a, and a pair of lower ohmic conductors 31, 32. A visible indicator 27 is mounted on substrate 20a and is ohmically connected to binder identification circuit 20 via suitable conductors. Visible indicator 27 is preferably an LED positioned in an opening formed in spine 15 so as to be visible from the outer side of binder 30.

Secured to the inner surface of front cover 12 adjacent the lower edge is a single receiving antenna 35, which is ohmically connected to binder identification circuit 20 via lower ohmic conductors 31, 32. Receiving antenna 35 is a multi-turn essentially planar coil fabricated using conventional coil fabrication techniques and is arranged such that the plane thereof is essentially parallel to the plane of front cover 12 so that receiving antenna 35 is positioned in a vertical manner when binder 30 is removably installed on a shelf in a binder storage cabinet. When so positioned, receiving antenna 35 is capable of optimally receiving binder identification signals emanating from a transmitting antenna array 60 shown in FIG. 6.

Figure 11:
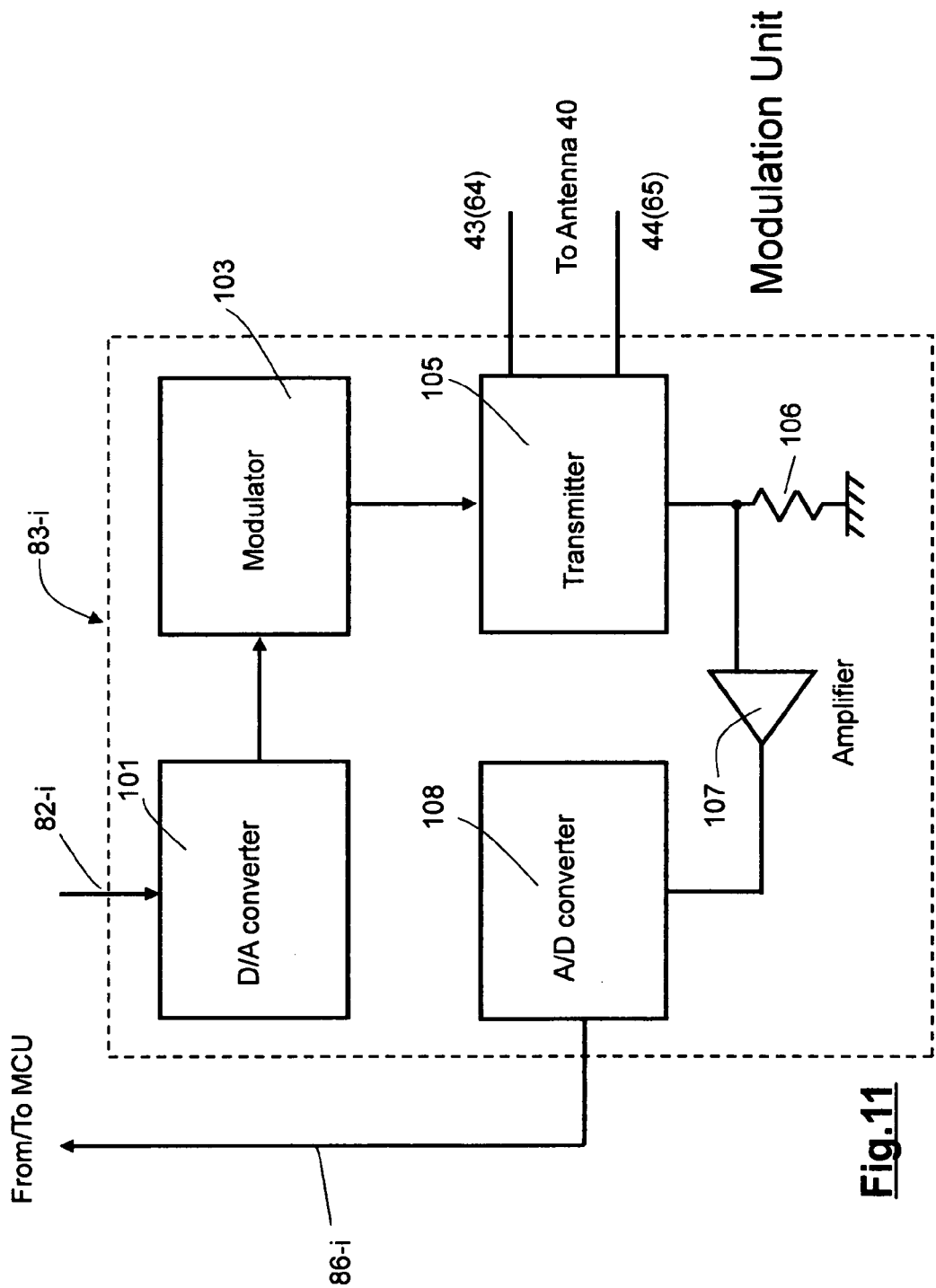
FIG. 11 is a diagram of a modulation unit.

With reference to FIG. 6, which is a plan view taken from above, transmitting antenna array 60 comprises a plurality of individual multi-turn essentially planar coils 62-1, 62-2, . . . , 62-n each having a pair of terminals 64-1, 64-2, . . . , 64-n; 65-1, 65-2, . . . , 65-n coupled to an associated modulation unit, one of which is illustrated in FIG. 11 described below. Each modulation unit supplies identical binder identification signals to the associated transmitting coil 62-1, 62-2, . . . , 62-n . Transmitting antenna array 60 is secured to a substrate 66, which provides a support structure for mounting transmitting antenna array 60 to an upper surface of a shelf in a binder storage cabinet shown in FIG. 7 and described below. Substrate 66 may be fabricated from any suitable material, such as sheet fiberglass material used in the fabrication of printed circuits. Coils 62-1, 62-2, . . . , 62-n can be formed using standard etching techniques which are well known in the art of printed circuit board manufacture. All coils 62-1, 62-2, . . . , 62-n have substantially the same length and width and the same number of turns so that their physical dimensions are the same. After forming coils 62-1, 62-2, . . . , 62-n, transmitting antenna array 60 can be installed on the upper surface of a shelf in a binder storage cabinet by applying a suitable adhesive to the coil side of substrate 66 and adhering the coil side to the upper surface of the shelf. By mounting the transmitting antenna array 60 with the coil sides down, the back surface of substrate 66 is the surface which makes sliding contact with a binder 50 when the binder 50 is installed and removed from the shelf of the binder storage cabinet, which eliminates wear and tear on the coils 62-1, 62-2, . . . , 62-n . The length and width dimensions of transmitting antenna array 60 are selected to match the dimensions of the shelves in the binder storage cabinet so that the length of transmitting antenna array 60 spans the width of a given shelf and the width of transmitting antenna array 60 spans the area where a binder antenna 35 is located when transmitting antenna array 60 is installed properly and a binder 50 is positioned on a given shelf. As will be apparent to one of ordinary skill in the art, the number of coils 62-1, 62-2, . . . , 62-n will depend upon the individual coil dimensions and the length dimension of a shelf on the upper surface of which the transmitting antenna array 60 is designed to be mounted. It is noted that coils 62-1 may have other geometrical configurations than the rectangular configuration with rounded corners depicted in FIG. 6. For example, elliptical and square coils may be used, if desired.

Critical to the proper operation of the embodiment shown in FIGS. 5 and 6 is the relative spacing of coils 62-1, 62-2, . . . , 62-n . In general, the coils 62-1, 62-2, . . . , 62-n must be arranged in the staggered manner depicted in FIG. 6 so that receiving antenna 35 mounted in front binder cover 12 (FIG. 5) is always in a position to receive binder identification signals of sufficient strength to be reliably detected and processed in binder identification circuit 20, regardless of the lateral position of the binder 50 on the shelf. In the preferred configuration shown, the lateral spacing between adjacent coils 62-1, 62-2, . . . , 62-n in a given row of coils is equal to ½ the length of an individual coil, while the coils in adjacent rows are offset by ¼ the length of an individual coil. This configuration ensures that a receiver antenna 35 placed over the null region near the geometric center of a transmitting coil always lies within the range of another transmitting coil. In contrast, were the FIG. 5 binder 50 placed on a binder cabinet shelf containing the single transmitting antenna 40 with the vertically oriented receiving antenna 35 located over the null spot of transmitting antenna 40, no binder identification signal would be detected.

Figure 7:
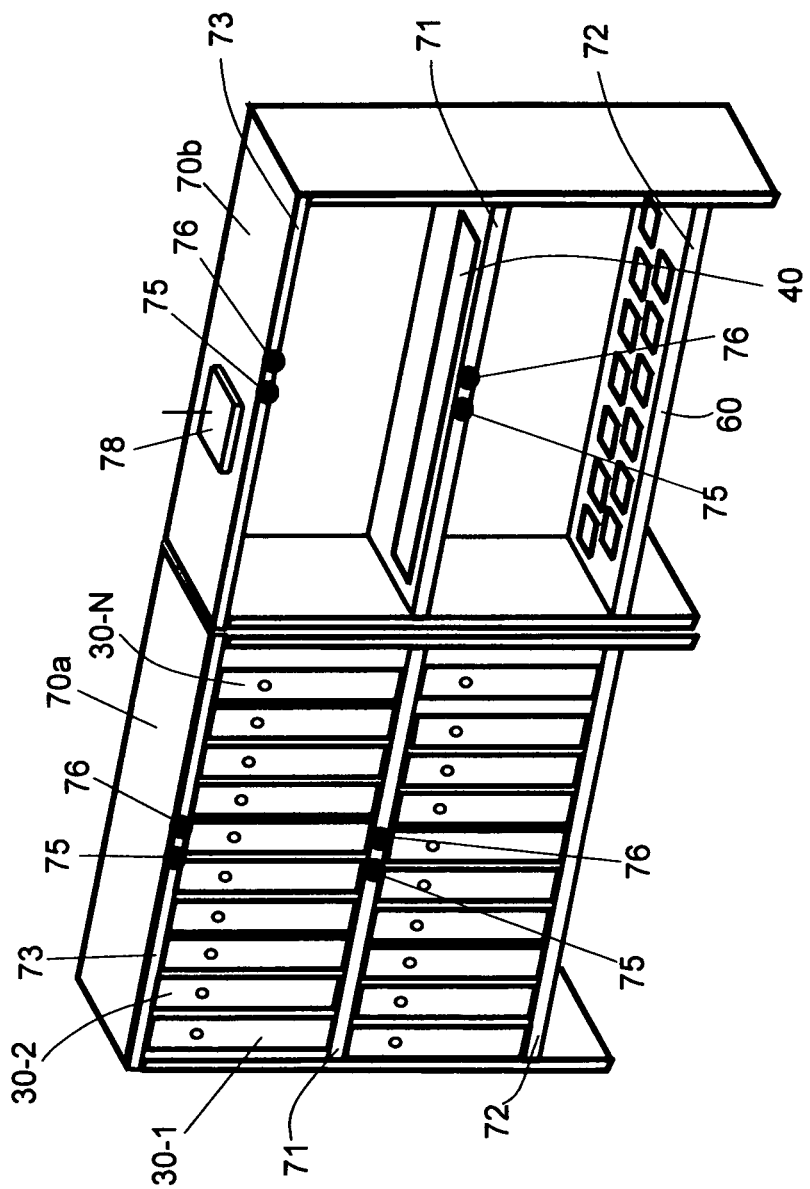
FIG. 7 is a perspective view of a binder storage cabinet illustrating the antenna placement on the cabinet shelves.

FIG. 7 is a perspective view of a pair of multiple-shelf binder storage cabinets designed for use with the binders 30 and 50 of FIGS. 3 and 5. As seen in this Fig., each binder storage cabinet 70a, 70b has a plurality (2 illustrated) of storage shelves 71, 72 and a top shelf 73. A plurality of binders 30-1, 30-2, . . . , 30-N are removably received on a given shelf 71, 72 in binder storage cabinet 70a. Each shelf 71, 72 has an associated visible indicator 75, preferably an LED; and an optional audible indicator 76, such as a type AT-1220-TT-R available from PUI Audio, Inc. of Dayton, Ohio, for a purpose to be described. Mounted on an appropriate portion of the pair of storage cabinets 70a, 70b is a unit 78 illustrated in more detail in FIG. 8 containing a local microcomputer and a conventional wireless transponder (Wifi unit) capable of sending and receiving information to and from a host computer, and a number of modulation units described below.

Cabinet 70b is depicted in FIG. 7 without any binders 30-i installed in order to illustrate the placement of transmitting antenna 40 and transmitting antenna array 60 on the shelves of a binder storage cabinet. Transmitting antenna 40 is shown as mounted on the upper surface of upper shelf 71; while transmitting antenna array 60 is shown as mounted on the upper surface of lower shelf 72. It is understood that both shelves may contain a transmitting antenna 40 or a transmitting antenna array 60.

Figure 8:
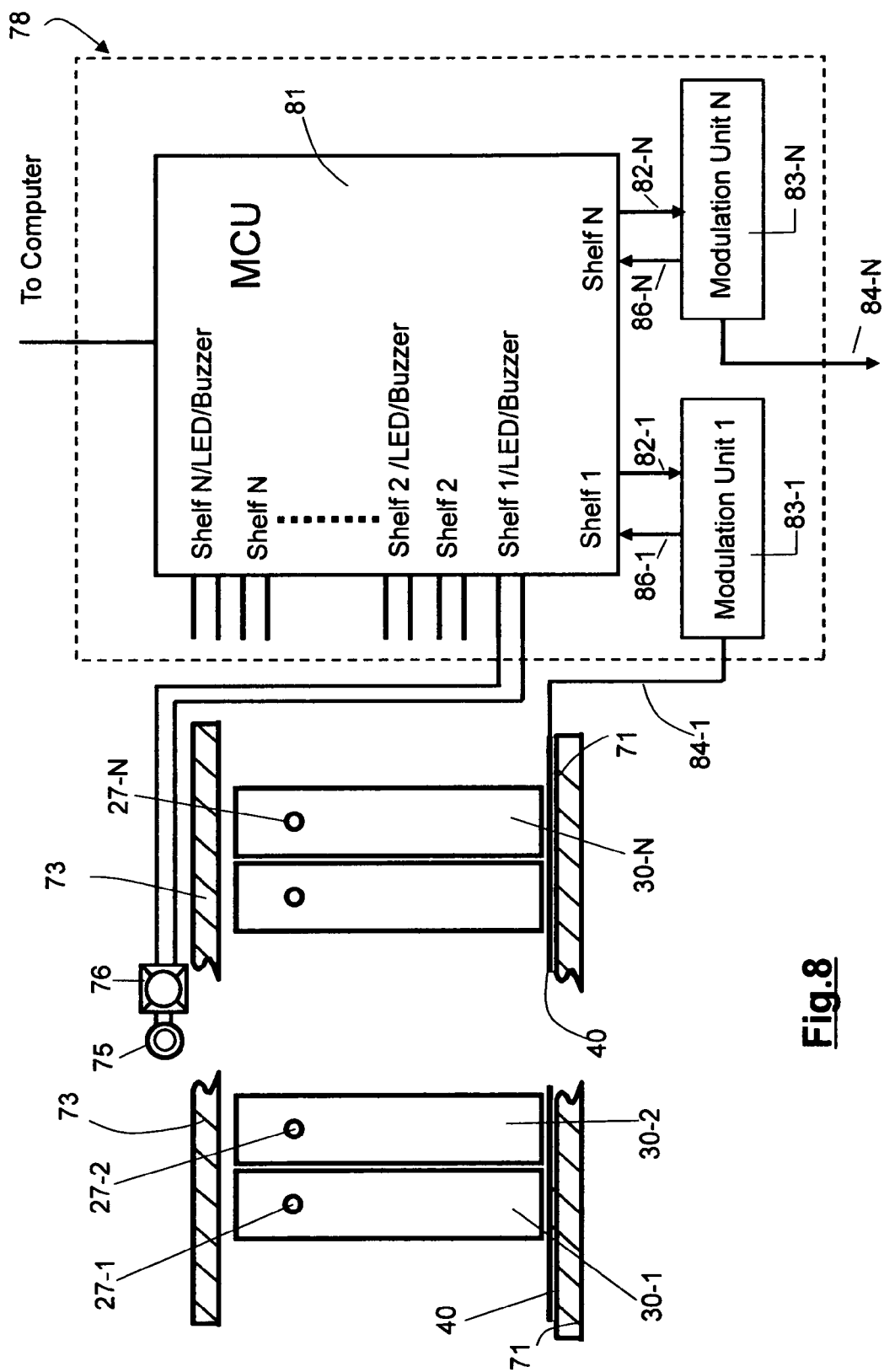
FIG. 8 is a block diagram of the cabinet electronic circuitry used to communicate binder identification signals from a host computer to the individual binders using the transmitting antenna of FIG. 4.

FIG. 8 is an enlarged partial front schematic view of that portion of binder storage cabinet 70a including top shelf 73 and middle shelf 71 and illustrating unit 78. As seen in this Fig., a local cabinet microcomputer (MCU) 81, such as a type AT89C2051 device available from Intel Corporation of Santa Clara, Calif. or a type LPC 1766 available from NXP Semiconductors of Eindhoven, The Netherlands, has a plurality of data output terminals 82-1 . . . 82-N each coupled to an input of an associated modulation unit 83-1 . . . 83-N. MCU 81 also has other paired input/output terminals labeled "Shelf 1/LED/Buzzer, Shelf 2/LED/Buzzer, . . . , Shelf N/LED/Buzzer" in FIG. 8 which are coupled to the visible indicators 75 and optional audible indicators 76 of each shelf pair. MCU 81 is also coupled by means of the wireless transponder noted above to a host computer as denoted by the legend "To Computer".

Each modulation unit 83-1 . . . 83-N has a pair of output terminals 84-1 . . . 84-N coupled to the terminals 43, 44 of an associated transmitting antenna 40 mounted on a corresponding shelf in binder storage cabinet 70a. When MCU 81 receives a sought binder identification signal from the host computer, it presents the system address of the particular binder specified by the binder identification signal from the host computer to each modulation unit 83-1 . . . 83-N in digital form. Upon receipt of the binder system address, each modulation unit 83-1 . . . 83-N generates an r.f. carrier signal modulated in accordance with the digital binder system address. These modulated carrier signals are coupled to the transmitting antennae 40 mounted on the cabinet shelves, which broadcast them to the receiving antennae 35 in each binder 30.

Each modulation unit 83-1 . . . 83-N has an additional output terminal 86-1 . . . 86-N which is coupled to a dedicated input terminal of MCU 81 and provides a path for a signal signifying that a sought binder has been found on the shelf served by that modulation unit 83-1 . . . 83-N.

Figure 9:
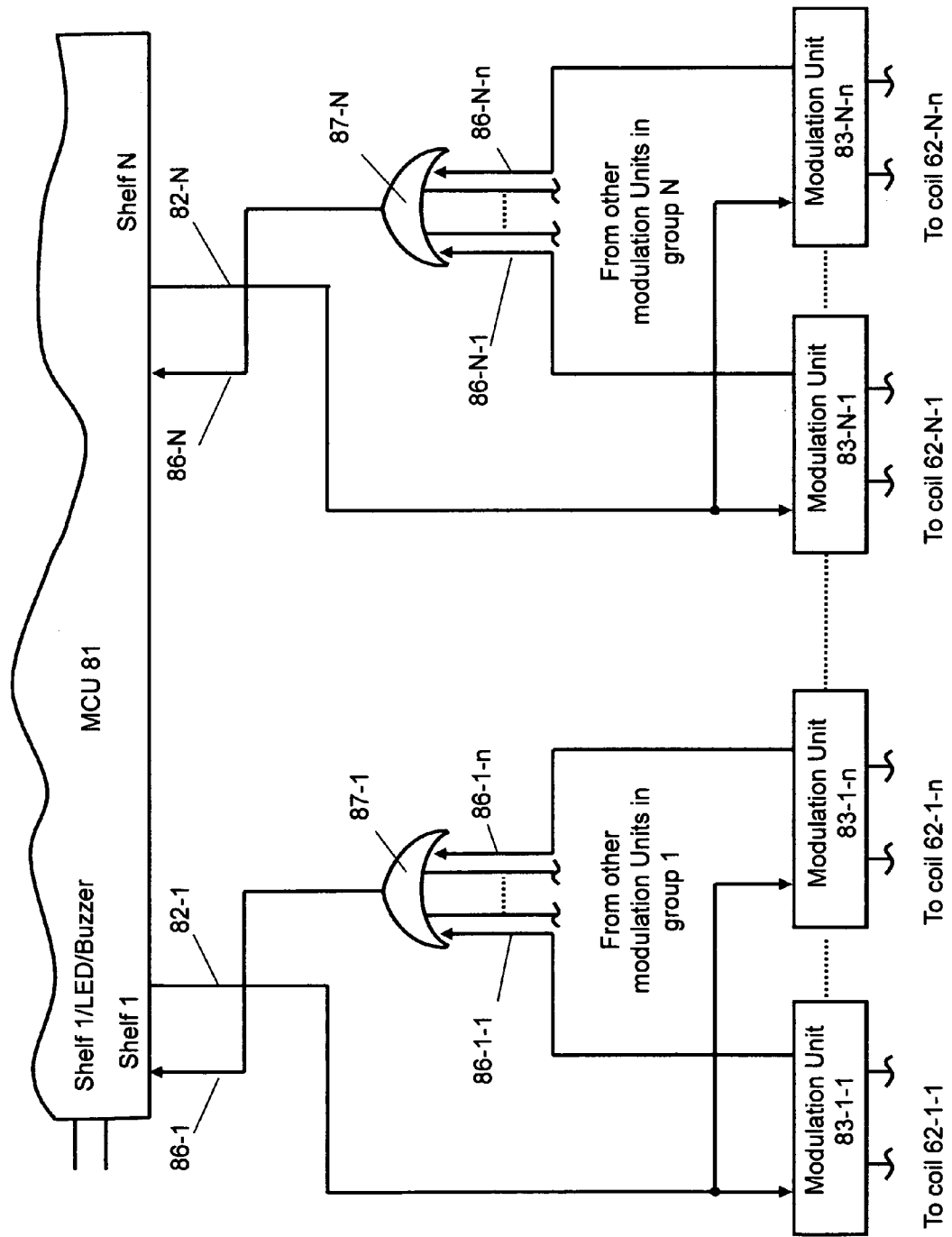
FIG. 9 is a partial block diagram of the cabinet electronic circuitry used to communicate binder identification signals from a host computer to the individual binders using the transmitting antenna array of FIG. 6.

While FIG. 8 has been described with reference to a grouping of modulation units 83-i configured for use with a collection of single coil transmitting antennae 40 each secured to a different shelf in a binder storage cabinet, FIG. 9 is an expanded diagram illustrating a modified grouping of modulation units 83-i configured for use with a collection of transmitting antenna arrays 60i each secured to a different shelf in a binder storage cabinet. As seen in this Fig., each coil 62-i-j in a given transmitting antenna array 60-i is provided with a dedicated modulation unit 83-i-j and the collection of modulation units 83-i associated with a given array is designated with a group identification i. For example, the modulation units associated with transmitting antenna array 60-1 mounted on shelf 1 are designated with group 1, the modulation units associated with transmitting antenna array 60-2 on shelf 2 are designated with group 2, and the modulation units associated with transmitting antenna array 60-N are designated with group N, where N is the total number of transmitting antenna arrays 60 installed in the cabinet. Further, within a given group each modulation unit is identified with an additional numerical character specifying the individual coil 62 with which it is associated. For example, within group 1, the modulation unit associated with coil number 1 is designated as modulation unit 83-1-1, the modulation unit associated with coil number 2 is designated as modulation unit 83-1-2, and the modulation unit associated with coil number n is designated as modulation unit 83-1-n , where n is the total number of coils in transmitting antenna array 60-1. Similarly, within group N the modulation unit associated with coil number 1 is designated as modulation unit 83-N-1, the modulation unit associated with coil number 2 is designated as modulation unit 83-N-2, and the modulation unit associated with coil number n is designated as modulation unit 83-N-n, where N is the total number of transmitting antenna arrays in the cabinet and n is the total number of coils in transmitting antenna array N. It is noted that the total number of coils n in a transmitting antenna array 60 may be different for different arrays 60. It is further noted that the number of transmitting antenna arrays 60 in a cabinet may differ from the number of shelves in the cabinet. The same is true for the number of transmitting antennae 40 in a given cabinet.

The binder system address signals emanating from MCU 81 are coupled in parallel to the data input terminals of the modulation units in a given group. For example, the binder system address signals for shelf 1 are coupled in parallel to the data input terminals of modulation units 83-1-1, . . . , 83-1-n ; the binder system address signals for shelf 2 are coupled in parallel to the data input terminals of modulation units 83-2-1, . . . , 83-2-n ; and the binder system address signals for shelf N are coupled in parallel to the data input terminals of modulation units 83-N-n.

Each modulation unit 83-i-j generates an r.f. carrier signal modulated in accordance with the digital binder system address received from MCU 81 and couples that signal to the associated transmitting coil 62-i-j. Each modulation unit 83-i-j- has an additional output terminal 86-i-j which provides a path for a signal signifying that a sought binder has been found on the shelf having the coil 62-i-j served by that modulation unit. The output terminals of the modulation units in a given group are ORd together so that the shelf on which the found binder is located is uniquely identified. For example, the group 1 modulation output terminals 86-1-1, . . . , 86-1-n are ORd together in OR gate 87-1; and the group N modulation output terminals 86-N-1, . . . , 86-N-n are ORd together in OR gate 87-N.

FIG. 10 is a schematic view of a binder identification circuit 20 using an addressable decoder integrated circuit chip. As seen in this Fig., receiving antenna 35 is ohmically connected to an address input IN of an address decoder chip 90 which has a unique address hard wired therein by means of address input terminals A0-A7. Address decoder chip 90 is preferably a type PT2272 address decoder available from Princeton Technology Corp. of Taipei, Taiwan. Receiving antenna 35 is also coupled via a diode 92 to a storage capacitor 94 to provide D.C. power to chip 90 whenever there is an incoming binder address signal from the associated modulation unit 83i. When the associated modulation unit 83i supplies a multi-bit address to receiving antenna 35, this information is serially coupled to the IN input of address decoder chip 90 and compared with the address hard-wired into decoder chip 90. If the incoming address matches the hard-wired address, decoder chip 90 outputs a signal on terminal VT which activates binder spine LED 27. The activation of visible indicator 27 causes D.C. current to flow through indicator 27 to ground. This current flow is sensed by the modulation unit 83-i driving the transmitting antenna 40-i serving the shelf on which the activated binder spine LED 27-i is located, and this sensing event is communicated to MCU 81 via output terminals 86-1 . . . 86-N. MCU 81 then activates the shelf LED 75 and optional audible indicator 76 for the shelf on which the binder 30-i having the matched address decoder chip 90 is located. MCU 81 also transmits a "Found" signal to the host computer when an address match has been detected, along with an identification of the storage cabinet and the shelf on which the found binder is located.

FIG. 11 is a block diagram of a single modulation unit 83-i. As seen in this Fig., the binder identification digital signal on terminal 82-i supplied from MCU 81 is coupled to the input of a conventional digital-to-analog converter 101. The analog signal output from digital-to-analog converter 101 is coupled to the signal control input of a conventional r.f. signal modulator 103. R.f. signal modulator 103 generates a carrier wave at a specified frequency which is modulated in accordance with the analog signal value at the modulator signal input. The output of r.f. signal modulator 103 is coupled to the carrier input of a conventional power transmitter 105, which raises the signal power level to an appropriate value. The signal output of transmitter 105 is coupled to the antenna terminals of either a single coil antenna 40 or one of the coils in a transmitting antenna array 60, depending on which transmitting antenna configuration is used. A resistor 106 connected between power transmitter 105 and circuit ground measures the current draw by the power transmitter 105 during transmission. The voltage developed across resistor 106 is coupled to the input of a standard power amplifier 107. The output of amplifier 107 is coupled to the analog input of a conventional analog-to-digital converter 108. The digital signal developed at the output of analog-to-digital converter 108, which is the digital equivalent to the analog input signal, is coupled back to MCU 81 via terminal 86-i.

In use, when a modulator unit 83i is transmitting a binder identification signal the value of the current draw by power transmitter 105 will quickly stabilize to a certain value. When a decoder identification circuit 20 finds a match between the received binder identification signal and the binder address stored in the decoder chip 90, the binder spine LED 27 is activated, which causes a notable increase in current draw by power transmitter 105. This current increase is detected by resistor 106 and the resulting change in signal level is sent in digital form to MCU 81, which registers the change as a found binder.

Figure 12:
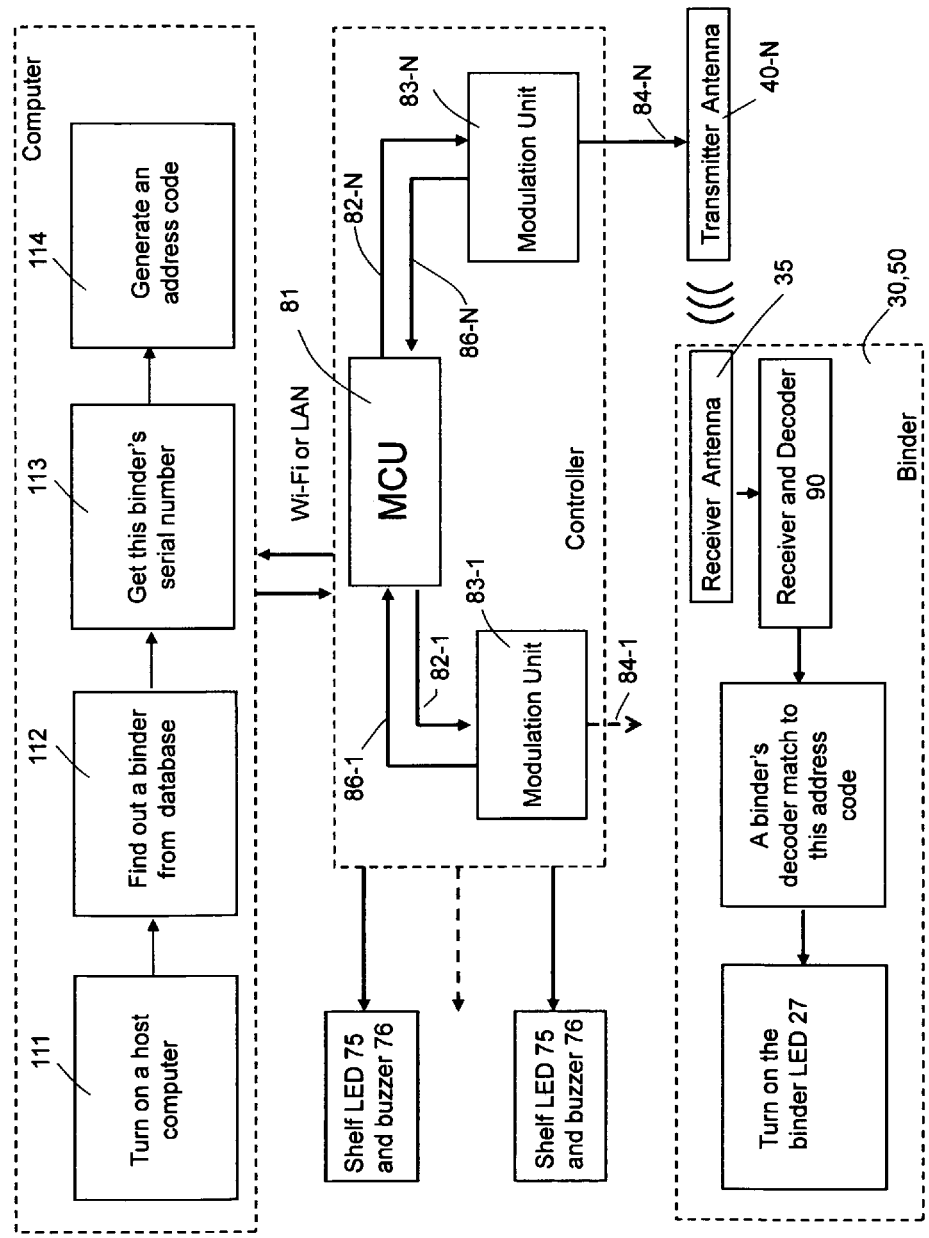
FIG. 12 is a schematic block diagram illustrating the binder location technique according to the invention.

FIG. 12 is block diagram illustrating the binder location technique used in conjunction with the binder identification circuit of FIG. 8. As seen in this Fig., the process begins with an operator turning on the host computer in flow block 111. Thereafter, in block 112 the operator enters the system descriptive identification of a binder. Next, the host computer searches the system database for the serial number of the specified binder (block 113). Once the binder serial number has been located, the host computer generates the corresponding address code of the binder to be found (block 114). This code matches the code hard-wired into the decoder chip 90 contained in the binder to be found. This address code is then broadcast by the host computer to all MCUs 81 in the system. Each MCU 81 then outputs the received address code to the modulation unit 83-i or modulation units 83-i-j for each shelf and awaits a positive response on the data lines 86-1, ..., 86-N. Each modulation unit 83-i causes the associated transmitting antenna 40-i or transmitting antenna array 60-i to generate an r.f. signal containing the address code of the sought binder. Each receiving antenna 35 within range of the transmitting antenna 40-i or transmitting antenna array 60-1 receives the transmitted signal and couples the signal to the associated decoder chip 90. If the received signal matches the decoder chip's address, the decoder chip 90 turns on the binder spine LED 27. The additional current drawn by the activated binder spine LED 27 is sensed by the corresponding modulation unit 83-i or 83-i-j and produces the binder found signal, which is coupled to the MCU 81 via terminal 86-i. When the MCU 81 receives the binder found signal the MCU 81 then activates the corresponding shelf LED 35 and optional buzzer 36 and generates a "Found" signal which is then transmitted to the host computer by the Wifi unit. The operator can then look around the binder storage area for the shelf with the activated shelf LED 75, proceed to that shelf and look for the binder with the activated binder spine LED 27. If the optional audible indicator 76 is provided (typically for a relatively large binder storage area or a brightly lit area), the operator may proceed in the direction of the audible sound until the illuminated shelf LED 75 is visually located.

The integrity of the entire collection of binders 30-i, 50i can be quickly checked by operating the host computer in the sweep address mode. As the addresses are swept over the entire range of possible addresses, all binder identification circuits 20 which are operationally present in the collection of cabinets will respond by activating the corresponding binder spine LED 27 and this will be detected by the corresponding MCU 81 and a "Found" signal will be transmitted back to the host computer. The address of any missing or non-functioning binder identification circuit 20 will not result in the generation of a "Found" signal, and this lack of response will be detected by the system host computer. This absence of an operational binder identification circuit 20 of a given specific address can be correlated by the system host computer to the binder identification in the system host computer by noting the addresses of the non-responsive binder identification circuits.

The system may be initially configured for the binders in several different ways. The most fundamental way is to place a single binder 30, 50 onto a shelf in a cabinet, cause the host computer to serially generate the entire range of permitted addresses, note the address at which the Found signal is generated by an MCU and the cabinet address and shelf identification, enter that information into a list in the host computer memory, remove the binder, insert another binder 30, 50, and repeat this process for all binders desired on a serial basis. This method works well for a new system with no existing binders and a relatively small number of binders required initially. A more useful technique is to insert a first binder onto a shelf, sweep the permitted addresses, note the address in that binder, enter that number into a new list; insert a second binder onto the shelf without removing the first, sweep the addresses, add the address in the new binder to the list; insert a third binder onto the shelf, sweep the addresses, add the of the third binder to the list; etc.

The binder management system described above affords all of the several advantages provided by the '143 patent system over known binder management systems. Firstly, a given binder can be quickly located in a binder storage area without the need to visually inspect all binder labels until the sought binder is located. Also, the integrity of the binder management system can be thoroughly tested remotely to find misfiled binders and to identify binders missing from the system. In addition, by employing the non-contact inductive transfer techniques described above, the invention avoids the disadvantages associated with a system requiring mechanical and effective ohmic electrical contact between binder elements and shelf support elements.

The transmitting antenna array 60 of FIG. 6 may be used in other applications than binder management systems. Such other applications are those which are configured in such a way that an essentially planar receiving antenna 35 can be positioned at an angle with respect to an essentially planar transmitting antenna. One such other application is an inductive charging unit for electronic devices-usually portable, e.g. a smart phone-which recharges the battery in an electronic device by inductive transfer of energy from the charging unit to the electronic device. If a planar antenna 40 of the type shown in FIG. 4 is used and the receiving antenna in the electronic device is a planar coil, efficient transfer of energy can only be assured if the two antennae are mutually arranged in parallel planar fashion. When a transmitting antenna array 60 is used in such an application there is no such constraint since the mutually spaced array of at least two rows with coils in one row laterally spaced with respect to coils in another row ensures efficient transfer of charging energy.

Although the above provides a full and complete disclosure of the preferred embodiments of the invention, various modifications, alternate constructions and equivalents will occur to those skilled in the art. For example, although the binder 30 of FIG. 3 having the horizontal coil arrangement has been described for use in combination with the single transmitting coil of FIG. 4, binder 30 can be used in combination with the transmitting antenna array of FIG. 6 with efficient results. In fact, some system designers may prefer to employ the FIG. 6 transmitting antenna array on all cabinet shelves due to its compatibility with both binder embodiments (in contrast to the single transmitting coil of FIG. 4, which is only compatible with the binder 30 of FIG. 3). Also, while coil 35 is shown and described in the FIG. 5 binder embodiment as mounted on the inside of the front cover of binder 50, coil 35 may be mounted on the inside of the rear cover, if desired. In addition, while binder mechanism 16 has been described and illustrated as being mounted on the inside surface of back cover 14, it may be mounted on the inside surface of the front cover 12, if desired, or on the inside surface of the spine 15. If mounted on the inside surface of spine 15 care should be taken that the usually electrically conductive binder mechanism is electrically isolated from elements 20, 20*a*, 31, 32, 33, and 34. Further, the invention may be used to manage a binder management system of many cabinets positioned at different physical locations using an internal or an external computer network, if desired. Therefore, the above should not be construed as limiting the invention, which is defined by the appended claims.

What is claimed is:

1. A searchable binder for use in a binder management system, said binder comprising:
   a binder body having a front cover, a rear cover and a spine joining said front cover and said rear cover;
   a binder mechanism mounted in the interior of said binder body;
   a visible indicator mounted on said binder body in a position visible from the outside of the binder;
   a multi-turn receiving antenna carried by said binder body for receiving a binder identification signal from a source, said binder identification signal comprising a binder address unique to the associated binder; and
   a binder identification circuit including an addressable decoder mounted on said binder body and coupled to said multi-turn receiving antenna and said visible indicator for activating said visible indicator when a received binder identification signal designates said binder as a sought binder.

2. The invention of claim 1 wherein said binder mechanism is mounted to an inner surface of said rear cover.

3. The invention of claim 1 wherein said visible indicator is mounted on said spine.

4. The invention of claim 1 wherein said spine has a lower margin; and wherein said multi-turn receiving antenna has an essentially planar configuration and is mounted on said spine substantially parallel to said lower margin of said spine so that said multi-turn receiving antenna is located in an essentially horizontal position when said binder is resting on an associated cabinet shelf.

5. The invention of claim 1 wherein one of said front cover and said rear cover is substantially planar; and wherein said multi-turn receiving antenna has an essentially planar configuration and is mounted on said one of said front cover and said rear cover in a plane substantially parallel to the plane of said one of said front cover and said rear cover so that said multi-turn receiving antenna is located in an essentially vertical position when said binder is resting on an associated cabinet shelf.

6. The invention of claim 1 wherein said front cover is substantially planar; and wherein said multi-turn receiving antenna has an essentially planar configuration and is mounted on said front cover in a plane substantially parallel to the plane of said front cover so that said multi-turn receiving antenna is located in an essentially vertical position when said binder is resting on an associated cabinet shelf.

7. A searchable binder system comprising:
   a storage cabinet for a plurality of searchable binders, said cabinet having at least one shelf; and a multi-turn transmitting antenna element carried by said at least one shelf for transmitting binder identification signals from a source; and
   a searchable binder adapted to be removably received on said at least one shelf, said binder comprising a binder body having a front cover, a rear cover, and a spine joining said front cover and said rear cover; a binder mechanism mounted in the interior of said binder body; a visible indicator mounted on said binder body in a position visible from the outside of the binder when said binder is installed on said at least one shelf; a multi-turn receiving antenna carried by said binder body for receiving a binder identification signal from said multi-turn transmitting antenna element, said binder identification signal comprising a binder address unique to the associated binder; and a binder identification circuit including an addressable decoder mounted on said binder body and coupled to said multi-turn receiving antenna and said visible indicator for activating said visible indicator when a received binder identification signal designates said binder as a sought binder.

8. The combination of claim 7 wherein said binder mechanism is mounted to an inner surface of said rear cover.

9. The combination of claim 7 wherein said visible indicator is mounted on said spine.

10. The combination of claim 7 wherein said spine has a lower margin; and wherein said multi-turn receiving antenna has an essentially planar configuration and is mounted on said spine substantially parallel to said lower margin of said spine so that said multi-turn receiving antenna is located in an essentially horizontal position when said binder is resting on an associated cabinet shelf.

11. The combination of claim 7 wherein one of said front cover and said rear cover is substantially planar; and wherein said multi-turn receiving antenna has an essentially planar configuration and is mounted on said one of said front cover and said rear cover in a plane substantially parallel to the plane of said one of said front cover and said rear cover so that said multi-turn receiving antenna is located in an essentially vertical position when said binder is resting on an associated cabinet shelf.

12. The combination of claim 7 wherein said front cover is substantially planar; and wherein said multi-turn receiving antenna has an essentially planar configuration and is mounted on said front cover in a plane substantially parallel to the plane of said front cover so that said multi-turn receiving antenna is located in an essentially vertical position when said binder is resting on an associated cabinet shelf.

13. The combination of claim 8 wherein said multi-turn transmitting antenna element comprises a single multi-turn coil having an essentially planar configuration and is mounted to said at least one shelf in a position at which said multi-turn receiving antenna is registered over said multi-turn transmitting element when said binder is resting on said at least one shelf.

14. The combination of claim 7 wherein said multi-turn transmitting antenna element comprises a plurality of multi-turn essentially planar coils arranged in a mutually spaced array of at least two rows with coils in one row laterally spaced with respect to coils in another row.

15. The combination of claim 7 further including a visible indicator mounted on said at least one shelf for visually indicating the presence of a sought binder on said at least one shelf.

16. The combination of claim 7 further including an audible indicator mounted on said at least one shelf for audibly indicating the presence of a sought binder on said at least one shelf.

* * * * *

UNITED STATES PATENT AND TRADEMARK OFFICE
CERTIFICATE OF CORRECTION

PATENT NO. : 9,884,507 B2
APPLICATION NO. : 14/998563
DATED : February 6, 2018
INVENTOR(S) : Zhu et al.

It is certified that error appears in the above-identified patent and that said Letters Patent is hereby corrected as shown below:

On the Title Page

Item (73) Assignee change "MICRODATA CORPORATION" to --iMicrodata Corporation--

Signed and Sealed this
First Day of May, 2018

Andrei Iancu
*Director of the United States Patent and Trademark Office*